United States Patent
Maller

(10) Patent No.: US 6,538,345 B1
(45) Date of Patent: Mar. 25, 2003

(54) LOAD BANK ALTERNATING CURRENT REGULATING CONTROL

(75) Inventor: Dennis A. Maller, Racine, WI (US)

(73) Assignee: Trombetta, LLC, Menomonee Falls, WI (US)

( * ) Notice: Subject to any disclaimer, the term of this patent is extended or adjusted under 35 U.S.C. 154(b) by 0 days.

(21) Appl. No.: 09/696,655

(22) Filed: Oct. 24, 2000

(51) Int. Cl.⁷ .................................................. H02J 1/00
(52) U.S. Cl. ............................................ 307/86; 307/64
(58) Field of Search .............................. 307/64, 85, 86; 361/159

(56) References Cited

U.S. PATENT DOCUMENTS

| | | |
|---|---|---|
| 3,723,855 A | 3/1973 | Shuleshko |
| 4,041,546 A * | 8/1977 | Stewart ...................... 361/152 |
| 4,384,213 A | 5/1983 | Bogel |
| 4,405,867 A * | 9/1983 | Moakler et al. .............. 307/64 |
| 4,467,220 A | 8/1984 | Page |
| 4,471,233 A | 9/1984 | Roberts |
| 4,560,887 A | 12/1985 | Schneider |
| 4,626,953 A | 12/1986 | Nilssen |
| 4,665,323 A | 5/1987 | Russell et al. |
| 4,717,998 A | 1/1988 | Cheron et al. |
| 4,742,243 A | 5/1988 | Zabar et al. |
| 4,761,726 A | 8/1988 | Brown |
| 4,935,606 A | 6/1990 | Geary |
| 5,003,161 A | 3/1991 | Geary |
| 5,010,469 A | 4/1991 | Bobry |
| 5,160,852 A | 11/1992 | Charles et al. |
| 5,418,401 A | 5/1995 | Kaneyuki |
| 5,541,458 A | 7/1996 | Hirst |
| 5,621,603 A | 4/1997 | Adamec et al. |
| 5,670,833 A | 9/1997 | Mengelt et al. |
| 5,748,431 A | 5/1998 | Goodnight et al. |
| 5,748,432 A * | 5/1998 | Przywozny et al. ........ 361/159 |
| 6,137,191 A * | 10/2000 | O'Leary et al. ............ 307/116 |

* cited by examiner

Primary Examiner—Brian Sircus
Assistant Examiner—Sharon Polk
(74) Attorney, Agent, or Firm—Ryan Kromholz & Manion, S.C.

(57) ABSTRACT

An electrical control module, including a control circuit, and voltage rectifier for controlling a solenoid. The control circuit is adapted for use in a transfer switch receiving power from two power sources and sending power to a single load, such as a commercial building or hospital. The control circuit and solenoid are designed to work over a broad range of voltages to quickly and efficiently transfer power from the first power source to the second. The circuit is particularly well suited for use in a closed transition transfer switch where the second source is connected before the first source is disconnected.

37 Claims, 4 Drawing Sheets

LOAD BANK ALTERNATING CURRENT REGULATING CONTROL

FIELD OF THE INVENTION

The present invention relates to electrical switching apparatus control modules and specifically to electrical control circuits for use with electrical transfer switches or load banks having solenoids to selectively energize an electrical distribution system from a plurality of electrical sources.

BACKGROUND OF THE INVENTION

In supplying electrical power to industrial and commercial facilities, it is often desirable to provide alternate sources of electrical power to insure continuity of service. Sometimes these sources may comprise separate feeder circuits from one or more municipal electric utility companies. In other situations, one or more alternate or non-utility based power sources, such as diesel engine powered generators may be provided as alternate power sources. To change from one power source to another a switch must be provided to switch the distribution system between the alternate sources, and it is often desirable to provide this switching capability as an automatic function. Thus, if the primary power sources should fail, a transfer switch system or a transfer switch with an associated control system will automatically switch the distribution system from the primary power source to the alternate power source.

A load bank is commonly located within the building into which each electrical power source is connected. Accordingly, the load bank has an input connected to the municipal utility power source, an input connected to the alternate power source, and an output connected to the building's electrical system or load.

The load bank further includes a switching mechanism, commonly known as a transfer switch, in order to switch the input between the power sources. In the past, the switching mechanism has been known to comprise an electromechanical device where an electrical motor is utilized to actuate or switch the load bank from one input source to the other. The electrical motor and associated linkage perform the work required to disconnect the primary power source and connect the secondary power source. The drawback of this arrangement is that the cycle time is relatively slow. In some applications, near instantaneous switch movement is preferred, especially in an electrical system where it is critical that the building distribution system is not interrupted, as in a hospital for example. It is also known in the art to replace the electromechanical system with a solenoid-mechanical system where an electric solenoid is utilized to switch between the power inputs. Each half of the transfer switch requires a dual action (two-pole) solenoid, two single action (single pole) solenoids, or a single action solenoid coupled with an inertial (flywheel) mechanism. To toggle back and forth from one power source to the other, the solenoid configuration must be capable of actuating or throwing the load bank switch in two directions.

Transfer switches are produced in a variety of voltage and current ratings and with varying numbers of poles or parallel electrical paths. Amongst these variations there are two major categorizations of switch systems, open transition and closed transition. An open transition switch disconnects the load from its first source of power before it makes connection to the second source of power. A closed transition switch connects the load to its second source of power before disconnecting from its first source of power. The closed transition switch requires more precise monitoring, control systems, and speed of operation to perform its task properly than an open transition switch. It provides the benefit of being able to transfer the load between electrical sources without an interruption in power. One common situation in which this is very beneficial is when testing backup power systems. This allows the switching mechanism to be cycled as a test without causing a power interruption at the load.

A solenoid is a common electrical device used to convert electrical energy into mechanical energy. Solenoids are well known in the art and are often utilized as a means of moving a component a predetermined distance at a predetermined time. In its most basic form, a solenoid is an electromechanical device that converts electrical energy into a mechanical motion, e.g. linear or rotary motion. Electrical current passes through a coil of insulated copper wire producing a magnetic field, which moves a ferro-magnetic plunger located within the core of the coil. Steel parts surround the coil to provide a flux path for maximum pull, push or rotational force. A solenoid can be used to open a valve, activate a switch, apply a brake or a number of other activities where mechanical movement is required and an electrical energy source is available.

A typical solenoid comprises a steel frame or shell that surrounds the coil of wire and directs the flux path. The coil assembly, when energized with an electrical voltage, creates the magnetic lines of force. A plunger, located within the coil assembly, reacts to the magnetic pull and moves to the center of the coil against a stop or pole piece. The pole piece provides a stop for plunger movement.

The problem that the present invention addresses is that different buildings are supplied with different input voltages and it has been necessary to select a solenoid and an associated solenoid control circuit such that the load bank switch could be operated within the available voltage range. For example one building may receive electricity at the 208 volt level where as another receives electricity at the 480 volt level or some voltage in between. In this instance, each respective load bank would require a different solenoid and different solenoid control circuit designed specifically for the voltage level.

In providing an automatic transfer control device for a specific application, it was usually necessary to engineer a custom design for each application, selecting various solenoids and control modules. It was also necessary to stock the specific control module and solenoid for each transfer control device for use as a replacement part. Accordingly, a great number of different control modules and solenoids were required to be stocked as replacement parts. The present invention provides for a single application over a great range of voltages thereby reducing the number of replacement parts needed to be stocked or kept on hand. Furthermore it is the nature of the method of control utilized in the present invention that also stabilizes the performance of the solenoid when source voltages drift significantly astray of their nominal values and/or when the solenoid coil resistance changes due to temperature changes.

The present invention also embodies such enhancements and conveniences as provision for receiving command/control signals directly from the low power output of programmable logic controllers (PLCs) or other microcomputer based control systems. It provides optical isolation of the control signal firm its own active circuitry. Additionally, the present invention incorporates a timing control which shuts off power to the solenoid after a preprogrammed period of time such that even if external control means should falter, the solenoid and controller will not be damaged from needless sustained high power dissipation.

SUMMARY OF THE INVENTION

It is an object of the present invention to provide a solenoid control system that operates over a range of 146 to 576 volts AC applied to one or both (normal and emergency) AC source inputs. This implies the further requirement that the controller, under the condition of both AC sources being active and potentially 90 degrees out of phase with one another be capable of operating with the rms value of the applied input voltage exceeding 700 volts. Solenoids provide faster operation than prior electric motors. Properly controlled, solenoid actuation occurs in less than 100 milliseconds. The simple mechanics of a solenoid-based system provides higher reliability. Furthermore, the fail neutral behavior of solenoids is particularly suitable to transfer switches because they require manual override capability. It is an object of the present invention to provide a solenoid and control module system that can operate over a wide range of voltages and over a wide range of temperatures without significantly varying in performance. This stabilizes and allows more optimization of system performance and additionally significantly reduces inventory requirements.

Solenoids can incorporate internal stops to remove shock load from the switch mechanism. It is an object of the present invention to provide a solenoid control system that provides an optically isolated interface directly to the master controller or programmable logic controller. No relays are needed. It is an object of the present invention to provide a solenoid control system that incorporates robust transient protection. The control module comprises an automatic timing control that protects the solenoid from burn-out and eliminates the need for end-of-travel limit switches. The compact design and size of the control module and solenoid saves space. The invention achieves current regulation through a very simple and low cost circuit that capitalizes on the conduct inherent in the solenoid load.

It is an object of the present invention to provide a solenoid control system utilizing a method of current sensing and the selection of components that eliminates the need to perform any post assembly adjustments to achieve usable regulation accuracy. The timing and regulation control portion of the circuit operates with a quiescent current requirement of only a few milliamps yet still is able to control very high power load banks. It does so through very efficient circuit design and the novel use of CMOS timer integrated circuits (ICs) as efficient insulated gate bipolar transistors (IGBTs) gate drivers. Finally, combined use of a resistor and capacitor (RC) snubber circuit and transient voltage suppressors protect the switching semi-conductors from high unclamped inductive energy levels associated with fast switching of currents through AC supply sources and power grids.

These and other objects are achieved by the present invention wherein an electrical control module supplies regulated current to each section of a dual action (two-pole) solenoid or to single action (one-pole) solenoids.

In one embodiment, the invention may be described as a system for transferring electrical power from a first power source to electrical power from a second power source having a transfer switch including first and second inputs and an output, the first electrical power source being connected to the first input and said second electrical power source being connected to the second input, a rectifier connected to at least one of the power sources, at least one solenoid, the solenoid mechanically coupled to the transfer switch, at least one solenoid control circuit, the solenoid control circuit being electrically connected to the rectifier and solenoid, and a controller, the controller being connected to the solenoid control circuit whereby the controller sends a signal to the solenoid control circuit thereby causing the solenoid to move the transfer switch from one of said power sources to the other.

In another embodiment, the invention comprises a solenoid control circuit connected to first and second voltage sources, connected to an external signal mechanism and connected to a solenoid having at least one coil. The circuit includes a control means for receiving and validating a control signal from the external signal mechanism. A solenoid current regulator, including a current monitoring circuit, is coupled to the control means, is capable of receiving the control signal and is coupled to a micro-controller means. A power switching means is connected to and receives power from one of the voltage sources. The micro-controller is connected to and provides a current signal to the power switching means which is in turn connected to the solenoid coil. The current signal allows the current flowing through the solenoid to decay for a predetermined period of time after a predetermined current level is established in the solenoid coil.

In a third embodiment, a circuit for controlling the current applied to a solenoid having an external signal source and a voltage source including a signal receiving means, a power switching means and a current regulating solenoid driver circuit. The signal receiving means receives a signal from the external signal source. The power switching means is connected to the voltage source and the solenoid. The current regulating solenoid driver circuit is capable of monitoring the signal from the signal receiving means and sending an output to said power switching means thereby allowing the current flowing through the solenoid to decay for a predetermined period of time after a predetermined current level is established in the solenoid coil.

DETAILED DESCRIPTION

Although the disclosure hereof is detailed and exact to enable those skilled in the art to practice the invention, the embodiments herein disclosed merely exemplify the invention that may be embodied in other specific structure and/or methodologies. While the preferred embodiment has been described, the details may be changed without departing from the invention, which is defined by the claims.

Figure 2:
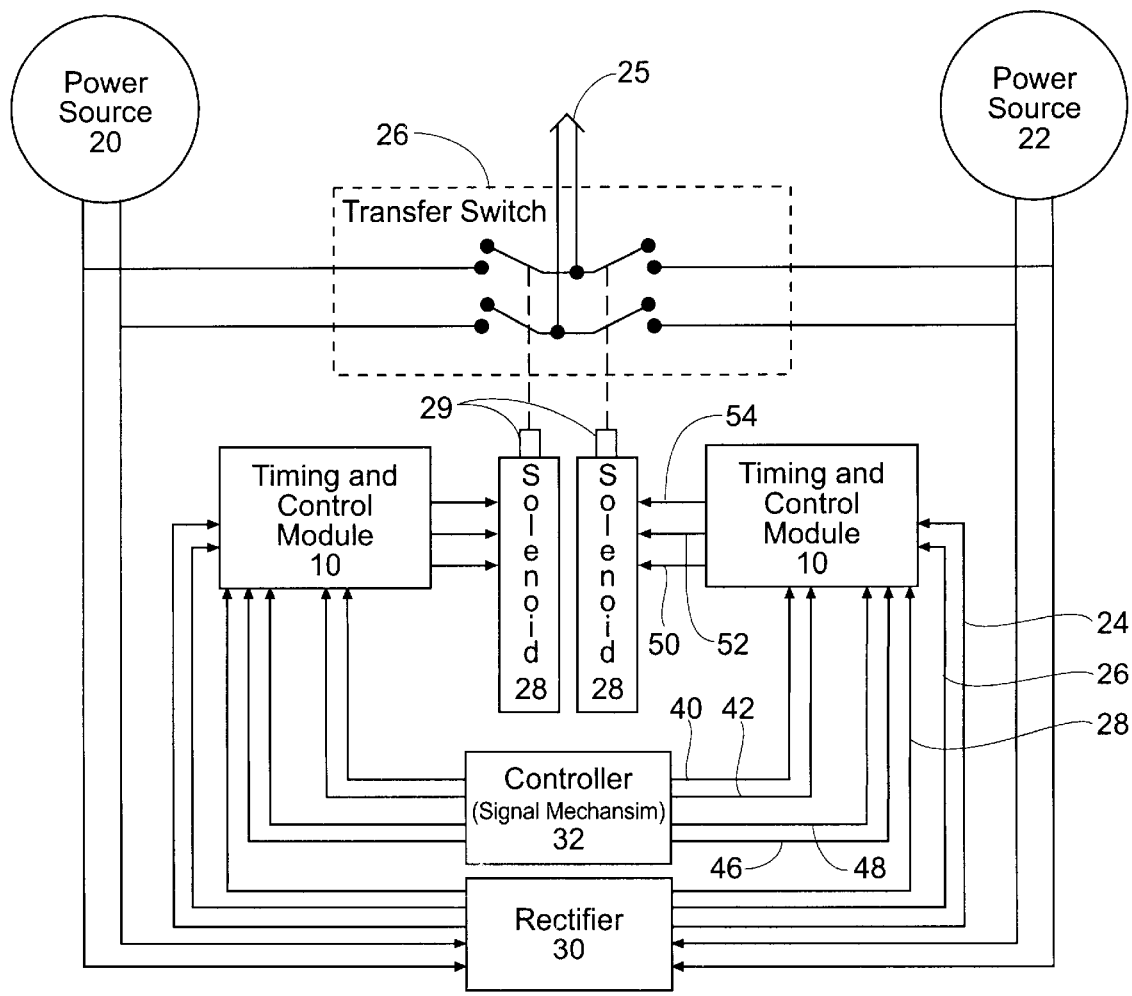
FIG. 2 is a diagrammatic view of a first power source, a second power source, a transfer switch having a pair of dual-action solenoids attached thereto, a pair of controller circuit assemblies, a rectifier circuit assembly and a master controller.
Figure 3:
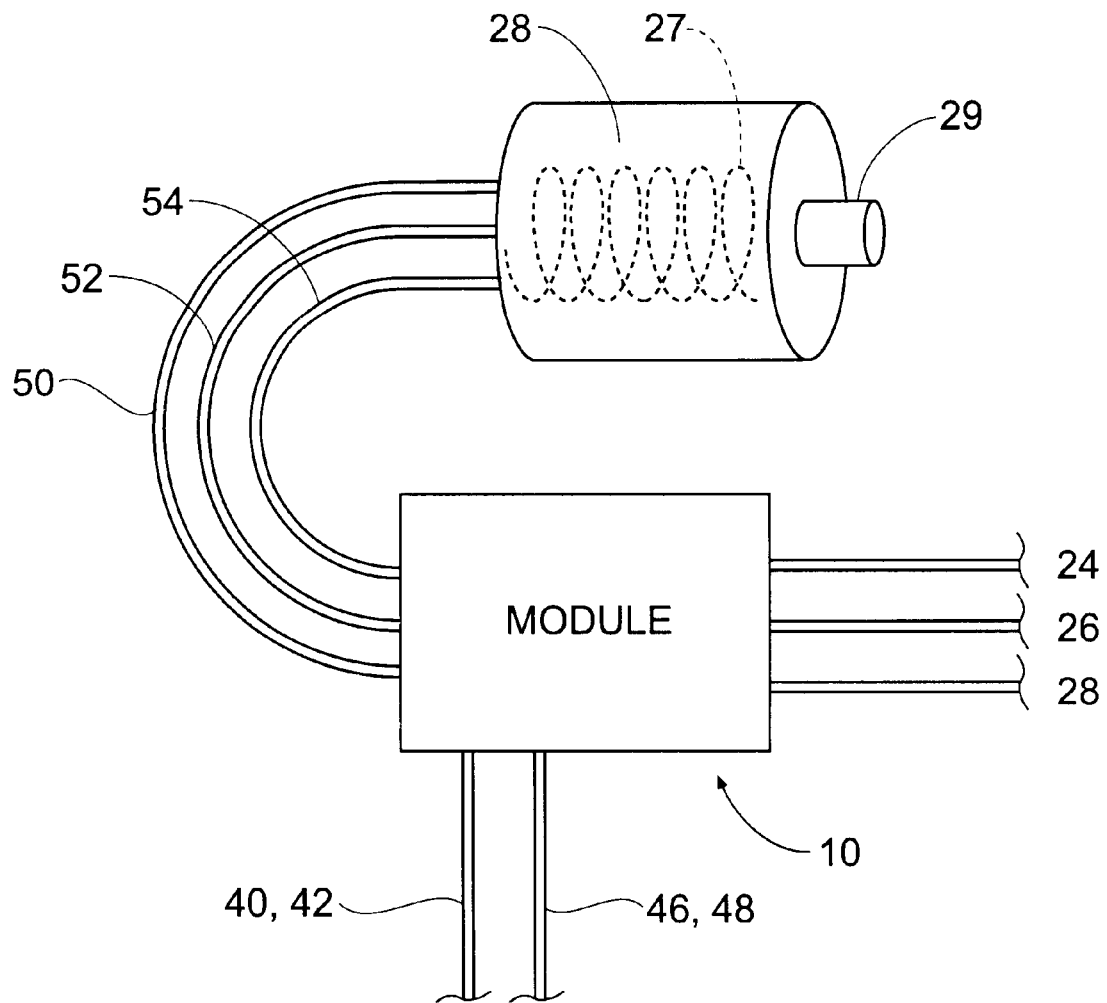
FIG. 3 is a diagrammatic view of a dual-action solenoid and the control module of the present invention.
Figure 4:
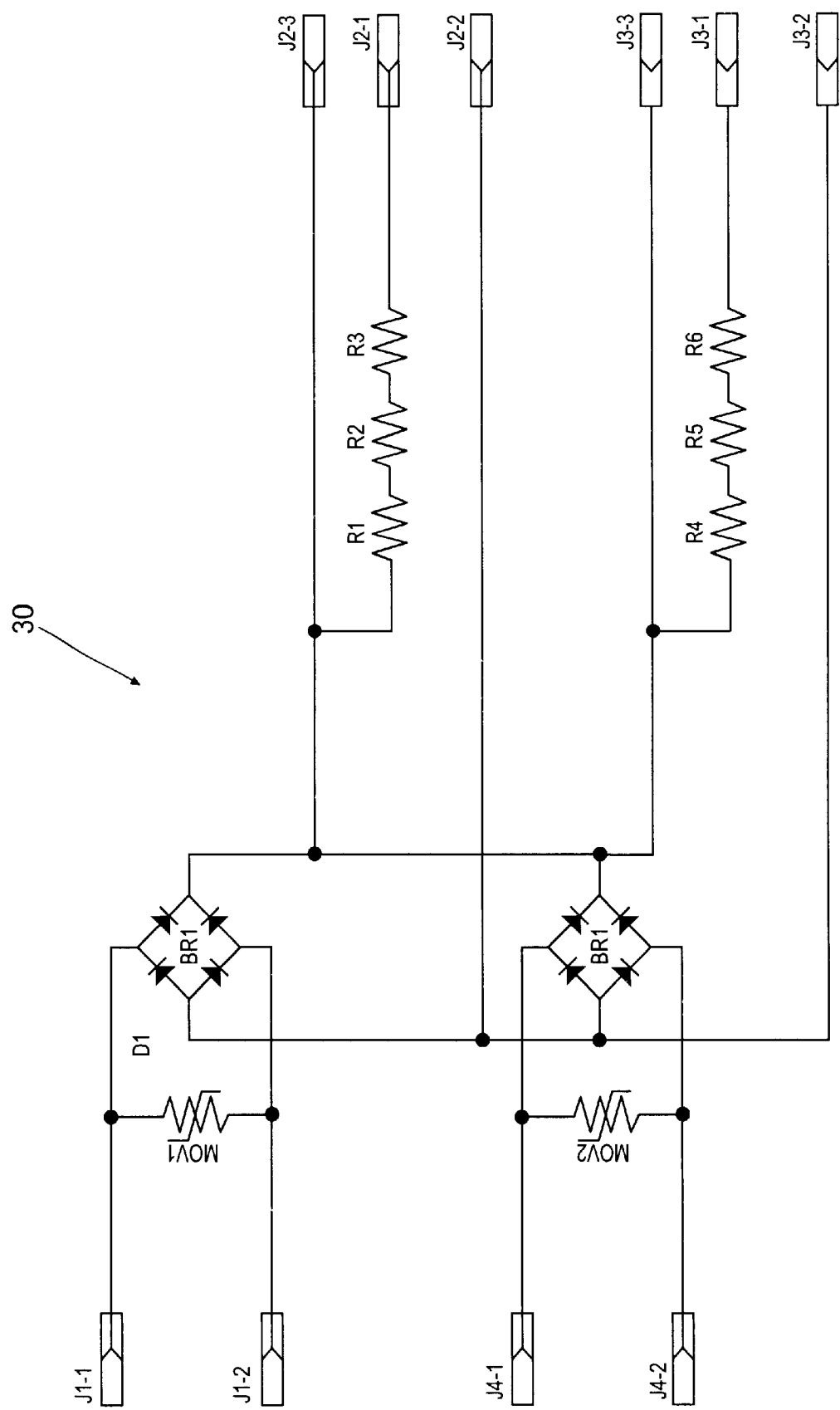
FIG. 4 is a detailed schematic circuit diagram of the rectifier.

The present invention, referred to at reference numeral 5 in the FIG. 2, is a novel solenoid timing and control system comprising two novel solenoid timing and control modules 10 and one rectifier module 30. The rectifier module 30, whose schematic circuit diagram is shown in FIG. 4, utilizes full wave bridge rectifiers (BR1 and BR2) that are well known in the art. In the preferred embodiment, the rectifier module 30 utilizes two rectifiers BR1 and BR2, as shown in FIG. 4. One derives its power from the normal power source 20 (usual utility) at inputs J1-1 and J1-2. The other derives its input power from the emergency power source 22 (most commonly a generator) at inputs J4-1 and J4-2. The rectifier module 30 is thus capable of drawing power from either the normal power source 20 or emergency power source 22, or both.

The outputs of both bridge rectifiers BR1 and BR2 are joined such that either or both bridge rectifier outputs can supply power to the solenoid controller module 10.

The rectifier module 30 rectifies (i.e. converts alternating current (AC) to direct current (DC)) the alternating current (AC) voltage from the source(s), supplying it via wiring harnesses to both controller assemblies 10. The rectified current is fed to each controller assembly 10 through a 3-wire connection to each. One of these wires, output J2-3 or J3-3 carries the power directly from the bridge rectifier outputs without any energy limiting. A second wire, J2-1 or J3-1 carries the power that is energy limited by an array of power resistors in series with the output. The direct output from the bridge rectifier (J2-3 and J3-3) is used, through the output of the controller 10, to provide high-energy electrical drive required by the solenoid 28 coils 27 to accomplish their work. The energy-limited line (J2-1 and J3-1) is used to feed the low voltage power supply requirements for the signal level electronics on the controller 10. Because this is an energy-limited line, the controller 10 is able to clamp or limit this line at the input of the controller 10 to approximately 50 volts direct current (DC) or less. The third wire, J2-2 or J3-2 is the power return or common for the power input lines to the controller 10.

As shown in FIG. 2, two power sources 20 and 22 are shown and available to provide electrical power to the building load 24. Power source 20 is the normal (utility) source. Power source 22 is the emergency or back-up power source. The control system 5 is specified to operate with either of these sources in the range of 146 to 576 volts alternating current (VAC). This corresponds to a source voltage range of 208 to 480 VAC +20%/−30%. In one typical application, an engine driven generator would constitute power source 22. A transfer switch 26 is supplied to toggle the electrical power between a first power source 20 and a second power source 22. A pair of solenoids 28 operates the transfer switch 26, one solenoid per side of the switch. Each solenoid 28 is preferably a linear, dual action solenoid. Two single action solenoids per switch section (four solenoids total) could be used in lieu of a pair of dual action solenoids. With certain transfer switch mechanisms all that may be required is one single action solenoid coupled to an inertial energy system with an over-center toggle mechanism for each section of the transfer switch. Regardless of this, the means of controlling the solenoid can remain the same.

Dual action solenoids have plungers that are capable of extending and retracting. As is also known in the art, solenoids are capable of performing work in a very small amount of time (i.e. when energized the solenoid plunger moves rapidly). The solenoid timing and control module 10 of the present invention is coupled to each individual solenoid 28. An OEM master controller, or the external signal mechanism 32 for sending an extend or retract signal to each controller 10 is also present in the system. In some applications, the master controller may be a programmable logic controller or PLC.

An important aspect of the invention is that it provides a mechanism for switching or toggling between two alternating current sources. When switching from one alternating current source to another, the transfer must occur when the phase (i.e. the fraction of cycle of a periodic waveform (usually sinusoidal) which has been completed at a specific reference time) of each source is substantially the same. This is absolutely critical in a closed transition system where the second current source is connected before the first current source is disconnected. Making a switch when the two sources are out of phase would cause a catastrophic effect to the building power load 25 and could have potentially damaging effects to the power sources and grid carrying current from sources 20 and 22.

The primary function of master controller or PLC 32 is to send a signal to the system 5 when a switch from first power source 20 to second power source 22 should occur or vice versa. Master controller 32 receives its power from a known stored energy source (not shown), such as a battery. In a closed transition system, the master controller 32 also monitors the phase relationship between the two power sources 20 and 22 so that a smooth, in phase transition can occur. The controller 32 monitors the phase angle of each power source. When the sources are substantially aligned (+/−5%), the two sources are brought together and then the non-selected source is disconnected.

Figure 1:
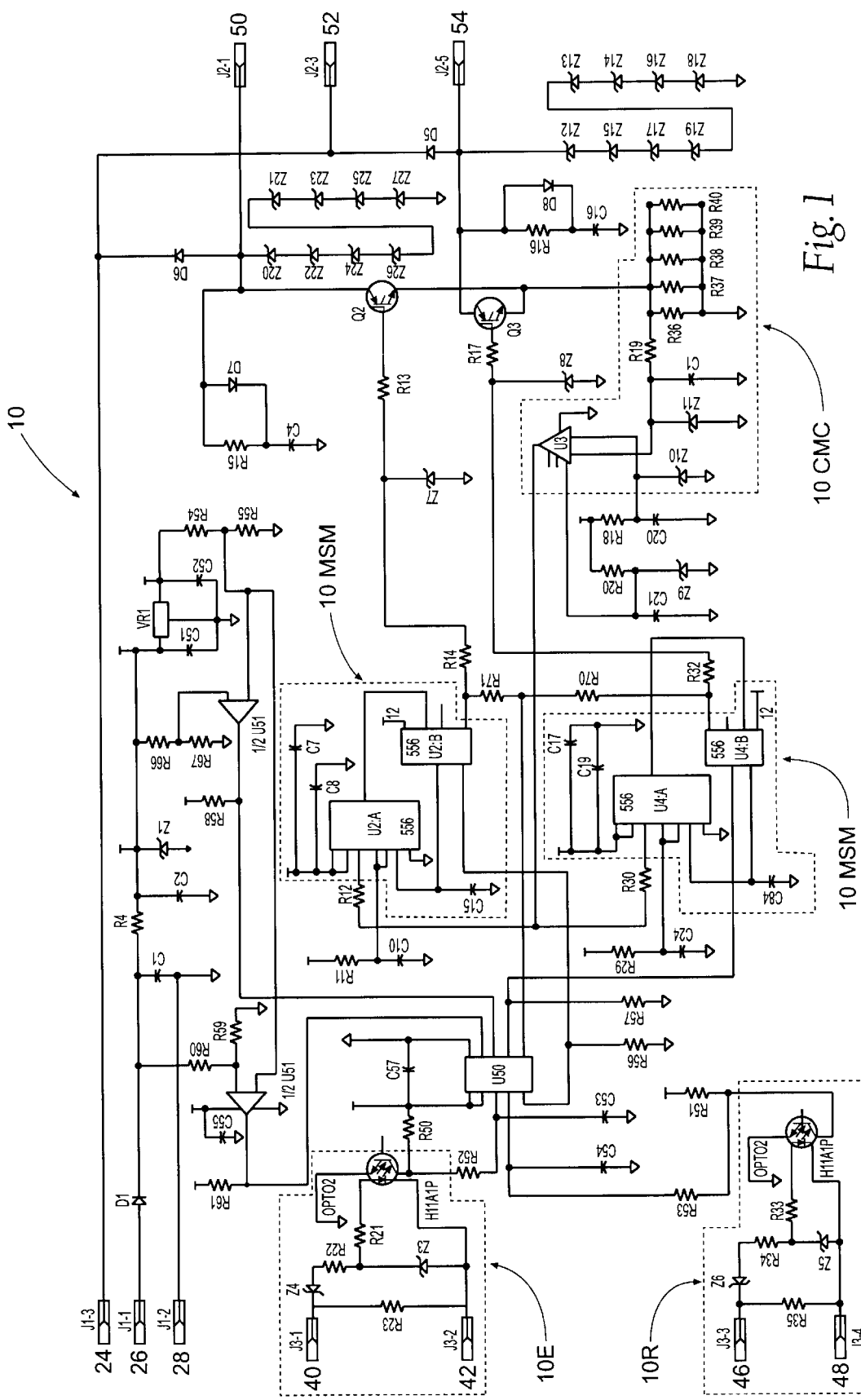
FIG. 1 is a detailed schematic circuit diagram of the control module of the present invention.

Now referring to FIG. 1, the voltage and current from at least one of the power sources are carried from the rectifier 30 through inputs 24, 26 and 28. Input 24 is the positive input without energy limitation, input 26 is the auxiliary energy limited positive input and input 28 is the neutral input. The module 10 has three output connections 50, 52 and 54. Output connection 52 is the common output. Output connection 50 is the extend connection that supplies a predetermined current to the retract coil 27 of solenoid 28. The third output 54 supplies a predetermined current to retract the plunger 29 of solenoid 28.

For purposes of illustration only, the circuit set forth below will be described to receive power from the rectifier 30 ranging from 146 volts to 576 volts rectified. It is to be understood that the source voltages and therefore rectifier output can vary. The source voltages may be greater in range or lesser than disclosed herein without departing from the invention claimed. Furthermore, it is to be expressly understood that this circuit, being able to receive a wide range of input voltages, can be used in virtually any voltage source and voltage level within its specified range of 146 VAC to 576 VAC without damaging the circuit. In addition, the circuit could be adapted at 600 volt and other nominals for different applications.

As shown in FIG. 2, the solenoid timing and control circuit 10 controls the current applied to the coil 27 of a solenoid 28 mechanically connected to the transfer switch 26. Referring now to FIG. 1, input voltage is supplied to the circuit 10 at lines 24, 26 and 28. Line 24 receives an input voltage that is the full wave rectified conversion of the normal source 20 or emergency source 22, typically a fixed voltage in the range of 208 to 480 volts but possibly varying anywhere in the range of 146 to 576 volts. Line 26 receives an input voltage from the rectifier assembly 30 that is energy limited by a series resistance of approximately 21,500 ohms. The voltage at this input is held to approximately 50 volts or less by the controller 10. Line 28 is the power input common.

D1, a rectifier diode is located in line 26, adjacent the input. Diode D1 blocks current flow back to the rectifier assembly 30 that could drain the on-board reserve capacitors. The combination of resistor R4 and diode Z1 protects the circuit 10 from an over-voltage condition. Furthermore, Z1 serves as a shunt regulator, setting the 16 volt supply voltage for much of the timing and control electronics on the controller board 10. Capacitors C1 and C2 function as reserve power capacitors. Z1, a zener diode holds the input voltage at substantially 16 volts. VR1 is a low quiescent current precision voltage regulator. VR1 with adjacent decoupling capacitors C512 and C52 comprises the 5 volt power supply required by the Microchip PIC series micro-controller U50.

U51 is a low power, dual voltage comparator. One-half of U51 in conjunction with associated resistor divider networks and using the precise output of VR1 as a reference voltage, monitors the 16 volt power supply. IGBTs Q2 and Q3 require adequate gate drive voltage for proper and safe operation. Should the 16 volt power supply voltage fall to approximately 13 volts or less, there may not be adequate voltage to drive Q2 and Q3 adequately into saturation when switched on. Should this situation occur, U51 signals the micro-controller U50 to inhibit IGBT gate drive. The other one-half of comparator U51, in conjunction with associated resistors divider networks and using the precise output of VR1 as a reference voltage, monitors the voltage across C1. The voltage across C1 is generally in the range of 20 volts direct current (VDC) to 50 VDC and is generally proportional to the AC source voltage which is nominally in the range of 208 VAC to 480 VAC, but which may vary to the extremes of 146 VAC to 576 VAC. By monitoring the voltage across C1, U51 can detect if the AC voltage is faltering substantially below the 208 VAC lower end of the nominal range. In such a case, U51 signals the micro-controller U50 to extend the time it applies power to the solenoid coil 27 from the nominal value of 105 milliseconds to the extended value of 150 milliseconds. This is done as a precautionary step to help assure that switch transfer will be accomplished even if it takes slightly longer than normal when the AC power source is weak.

Referring back to FIG. 2, the master controller or PLC 32 sends a signal to the circuit 10 when it is necessary to switch from the first power source 20 to the second power source 22 or vice versa. The control signal to extend the solenoid plunger 29 is received at inputs 40 and 42. The control signal to retract the solenoid plunger 29 is received at inputs 46 and 48. As will be apparent from FIG. 1, the circuit configuration for solenoid plunger extension (i.e. from inputs 40 and 42) and the circuit configuration for solenoid plunger retraction (i.e. from inputs 46 and 48) is nearly identical.

The controller assembly uses Insulated Gate Bipolar Transistors (IGBTs) as primary power switches to rapidly switch current on and off to the selected solenoid coil 27. The utility the IGBT as a power switch is know to those skilled in the art of designing power switching circuits. The particular IGBT chosen for this circuit is the IXYS 35N140. It is somewhat unique in its ability to switch 70 amps at moderate frequencies, maintains a 1400 volts drain to source breakdown voltage rating while housed in an easy to mount, relatively inexpensive JEDEC type TO-247 package. Most manufacturers furnish this level of power handling only in multi-die IGBT modules that are much larger, more expensive, more difficult and more costly to mount.

The 1400 volt rating of the IGBTs is of particular importance to the overall system scheme to deal with transient voltages. It is quite common for switching circuits operating at these voltage, power and frequency limits to utilize very large and costly high performance capacitors to absorb and constrain potentially destructive transient energy. This circuit, through well-planned overall system design, careful component selection and component rating selection, and well thought layering of transient energy suppression, avoids the requirement for such large and costly components. At the same time it achieves a high degree of robustness to deal with harsh electrical environments.

The micro-controller U50 performs numerous functions. It serves more or less as an overall system administrator. It monitors any signals received form the OEM master controller 32. Upon receipt of a signal via either of the optically isolated input circuits, U50 applies a validity test to the signal. It does so by sampling the signal on a repeated basis several times over approximately a 1 millisecond period. It does this in an attempt to reject any errant (i.e. electrical noise) related input transitions. Once the input signal is qualified as a valid signal, U50 enables the appropriate extend or retract solenoid coil driver circuit, initially for the default 105 millisecond solenoid drive duration. Throughout the 105 millisecond period, which follows, while the solenoid coil 27 is being driven, U50 monitors the outputs of the two comparators of U51. If at any time U51 signals that the AC supply voltage is low, then U50 will adjust the period of solenoid drive from 105 milliseconds to 150 milliseconds. At any time during the period solenoid drive is being applied, be that the normal 105 millisecond or the extended 150 millisecond, if the nominal 16 volts DC power supply falls to or below approximately 13 volts, then U50 disables solenoid drive by inhibiting the IGBT gate drive circuits. In doing so, it protects Q2 or Q3, whichever was driving the solenoid, from operation at high current with weak gate drive; such operation being potentially damaging because of high power dissipation which results when power transistors are operated in linear (non-saturated) mode at high current levels. Lastly when the solenoid drive is to be shut off, as required because either the programmed on time, i.e. 105 millisecond has been satisfied, or a low 16 VDC supply fault was detected, U50, through R70 and R71 checks for the presence of gate drive at Q2 and Q3. If U50 detects gate drive is active, it maintains IGBT gate drive for approximately another 20 microseconds. This is done in order to assure that the IGBT snubber circuitry will operate properly. The IGBT "on time" must always be long enough for its associated snubber capacitor C4 or C16 to substantially discharge through its associated 50 ohm resistor, R15 or R16 and the drain of the associated IGBT, before the IGBT turns off again.

The network of C4, D7 and R15 and the network of C16, D8 and R16 constitute snubber networks for safe operating area protection of Q2 and Q3 respectively. Such use of snubber networks is well known in the art of applying power switching semiconductors.

The solenoid controller module 10 utilizes two identical current regulating solenoid driver circuits, one for the extend coil, 10 E, one for the retract coil 10 R. The current regulating drivers (Drivers) are relatively fast and simple closed loop controls. The two Drivers share certain support circuits, external from the closed loop, which control overall timing and monitoring functions, i.e. basic control administration. Among these shared administration circuits are the voltage supplies, voltage monitoring circuits and the micro-controller previously described. The controller module 10 spends most of its time at rest. The solenoid drivers are inhibited while the micro-controller U50 monitors for an extend or retract command from the OEM master control 32. Extending or retracting a solenoid is achieved simply by momentarily removing the inhibit from the appropriate Driver. Another shared circuit, this one nested within the control loop of both Drivers, monitors current whenever either Driver is active. It is a feature of the controller that it will never energize more than one of the two connected solenoid coils at any time. The micro controller U50 enforces that constraint. This mutual exclusion feature allows the current monitoring circuit to be shared.

The current monitor circuit 10 CMC is comprised of current sense resistors R36–R40, a low pass filter made of R19 and C18, IC voltage comparator U3, precision voltage reference Z10 and associated support components. In its overall execution, the current monitor achieves a high degree of precision and speed of performance without need for adjustment of individual units and without any exceedingly expensive or uncommon components. Furthermore, the design achieves the goal of restricting to an absolute minimum, the number of components in the critical monitor circuit which need to be correctly picked, placed and soldered at time of assembly. In so doing, both the risk of a potentially catastrophic over-current fault due to component or assembly error, and the unit production testing requirement are held to an absolute minimum.

Parallel resistors R36, R37, R38, R39 and R40 constitute a precision voltage sense resistor array. When either extend IGBT Q2 or retract IGBT Q3 is in conduction, a voltage signal is developed across this array. The magnitude of the voltage generally equals the product of solenoid coil current multiplied by the resistance of the resistor array. R36–R40 are relatively inexpensive 2 watt or 3 watt metal oxide resistor with 1% individual resistance tolerance. By paralleling several 1% resistors, the realized precision of the array is actually better than 1%. The nominal resistance of the parallel array equals 0.02097 Ohms. This value can easily be adjusted by substituting values for any of the resistors in the array or removing one or more entirely. This approach to the sense resistor results in very high precision, high surge wattage capability. An added benefit is that it allows for simple and precise alteration by substitution of one or several low cost parts. Another added benefit is that these resistors can be automatically inserted during assembly by common automated insertion equipment. Alternatively, it is somewhat common for current regulating circuits to use one precision current sense resistor which achieves needed power handling capability through construction in a heat sink mountable package such as those manufactured by Caddock. These may cost several dollars each and generally cannot be assembled to a circuit board by common automatic insertion equipment. Total cost is therefore significantly greater. Additionally, value alterations may require special orders to the factory.

The voltage from the current sense resistor array is fed into the inverting input, pin 2, of U3, an Analog Devices AD8031 voltage comparator. Before being input to U3 the signal is conditioned by a simple low pass filter network formed by R19 and C18. This network serves to add slight noise filtration but more importantly, it masks the approximately 10 microsecond current spike, which results from the snubber capacitor discharging immediately upon turn on of the IGBT. The non-inverting input, pin 3, of U3 is connected to precision voltage reference Z10. Z10 holds the non-inverting input of the comparator at 1.235 volts. Other values could be used with corresponding adjustment of the current sense resistors. Z10 is chosen for its precision and for the fact that it requires less than 100 micro amps of current to sustain its precise regulation, unlike zener diodes that require several milliamps or more.

The device selection for U3 is critical. It requires a unique balance of characteristics. Of particular importance, it must be fast so as to be capable of protecting the output drivers from potentially damaging fault currents. It must have rail-to-rail input capability because one input swings to zero potential, and it must draw very little current from the power supply. The AD8031 has a 30V/microsecond output slew rate (i.e. maximum rate) and consumes only approximately 1 milliamp of current from the power supply and has rail-to-rail input and output capability. This is an uncommon combination of speed and low power consumption, which makes the AD8031 a particularly attractive choice. The AD8031 is limited to a maximum supply voltage of 12 volts, making the 16 volt supply un-useable. Its output drives the trigger inputs of 556 dual CMOS timer IC's U2A & U4A. The 556s run from the 16 volt supply so as to have sufficient voltage drive for the gates of IGBTs Q2 and Q3. The 556 trigger input voltage threshold is ⅓ of supply or approximately 5.3 volts in this case. That requirement is too high to allow U3 to be operated from the 5 volt supply used for the micro-controller. Resistor R20 and 10 volt zener diode Z9 along with decoupling capacitor C21 serve to create a 10 volt supply suitable to operate U3. 10 Volts is well-above U3's maximum input voltage which will be about 1.25 volts and allows U3's output to swing to 10 volts which is well above the 5.3 volts required at the trigger inputs of U2 and U4, thus providing good noise immunity.

The voltage across the sense resistor array constitutes the input signal to the current monitor circuit. Pin 6 of U3 is the output of the current monitor. U3 pin 6 is at approximately 10 volts when the voltage across the current sense array is less than the 1.235 volt reference. U3 pin 6 is at substantially zero potential when the voltage across the sense array is greater than the 1.235 volt reference. With the nominal resistance of the current sense resistor array set to 0.02097 ohms, U3 pin 6 will be high when the Driver output current is less than 1.235V/0.02097 ohms or 58.9 amps and it will switch low when output current exceeds 58.9 amps.

The output of the current monitor drives one half each of 556 dual CMOS IC timers U2 and U4, each configured conventionally as a monostable multi-vibrator, or "one-shot" device, 10 MSM. Their pulse output duration is set by the RC networks R11/C10 and R29/C24 for U2 and U4 respectively. The formula for the output pulse duration is $1.1 \times R \times C$, yielding a nominal one-shot output pulse period of 286 microseconds in this configuration. The one-shots are triggered when their trigger input, pin 6 is driven from a high state to a level less than ⅓ of the devices Vcc supply. Vcc in this circuit is set to a nominal 16 volts, resulting in the nominal trigger voltage threshold of 16V/3 or 5.3 volts. When triggered, the output switches from its rest condition of substantially zero volts to approximately Vcc. Thus one realizes that the one-shots U2A and U4A each generate a nominal 286 microsecond by 16 volts pulse whenever the Driver output current exceeds 58.9 amps. The choice of pulse duration was made with knowledge of the solenoid loads intended to be driven, enforcing intent to keep the maximum switching speed requirement for the circuit at approximately 2–3 KHz. As such the circuit is responsive with good control of average solenoid coil current, without placing undo switching loss related stresses on the IGBTs.

The output pin 5 of the one-shots U2A and U4A drive the trigger input, pin 8, of the second halves, U2B and U4B of the 556 dual CMOS timers. The threshold pin, pin 12, of U2B and U4B are tied to Vcc. In this configuration, they act as inverting buffers, i.e. when the trigger goes high (>⅓ Vcc) the output goes low (substantially 0 volts) and vice versa. Additionally, the reset input of U2B and U4B is controlled by micro-controller U50. That gives U50 control to enable and disable U2B and U4B outputs. To state it in digital controls vernacular, U50 gates the outputs of buffers U2B and U4B via their respective reset inputs. Thus, although U3 output triggers both one-shot circuits simultaneously, the gating control exercised by U50 will allow only one output, extend or retract as appropriate to the input command received, to pass through to the appropriate IGBT.

U2B and U4B drive IGBTs Q2 and Q3 respectively. The 556 CMOS timer IC is used in this somewhat unconventional manner for very good advantage. It is well suited to drive the IGBT gates. It has push pull outputs with ability to source and sink 100 milliamps of current, fast output rise and fall times (40 nano-seconds typical) and yet each dual IC consumes well under 1 milliamp of supply current. C7, C8, C17 and C19 provide noise decoupling between the 556 timer and other circuitry and they provide a localized reserve energy supply for the output buffer stages of the 556 to assist when they are driving current into their respective IGBT gates. C15 is a noise decoupling capacitor for the control voltage input of the 556s. Such use being generally considered good conservative design practice in circuits with potential for high switching noise generation as this circuit has.

The Q2 and Q3 IGBT gates are driven by U2B and U4B through 200 ohm resistors, R14 and R32 respectively. These resistors impose restraint on the charge flow to and from the IGBT gates so as to slightly slow the IGBT switching times. This is done for noise control and is known art. Zener diodes Z7 and Z8 protect the gates of Q2 and Q3 respectively from any possible excessive voltage stress implied to the IGBT gates. A common cause of such voltage stress being charges coupled from the drain to gate of the IGBT through parasitic drain to gate capacitance. Such charge transfer occurring at the instant the IGBT is turned off and its drain voltage potential rises rapidly by several hundred volts or more. R13 and R17 serve to provide slight buffering between the IGBT gates and zener diodes.

In total, current regulated drive is achieved as follows: When the circuit is at rest, the IGBTs are off, there is no significant current flow through the voltage sense resistors therefore no voltage is developed across them. Inverting input, pin 2 of U3 is essentially at zero potential with the non-inverting input, pin 3 at 1.235 volts. U3 output, pin 6, is therefore high. One-shots, U2A and U4A are inactive, outputs low. The inverting buffers, U2B and U4B, both having low inputs, seek to drive their outputs and associated IGBT gates high except that they are inhibited (gated off) by U50 via their reset pins. When the administrative circuitry receives a valid extend or retract command, it removes the inhibit from the appropriate buffer stage which turns on the appropriate IGBT applying voltage to the appropriate solenoid coil 27. The inductance inherent in the solenoid coil restricts the rate of rise of current in the coil to di/dt=e/L. "di/dt" being rate of rise in current in amps per second, "e" being the instantaneous voltage impressed across the solenoid coil and "L" being the solenoid coil inductance. The complete path for current driving the coils is from the active AC source(s) through the full wave bridge rectifier(s) on the rectifier assembly 30, from the positive output of the bridge rectifier(s) into input 24 of the controller assembly 10, into the common coil leg via output 52, through the coil and back into the controller assembly 10, via pin 50 (extend coil active) or pin 54 (retract coil active), from drain to source through Q2 (extend) or Q3 (retract) through the sense resistor array, R36–R40 and back to the negative output terminal of the full wave bridge rectifier(s) via pin 28 of controller assembly 10.

When current reaches the nominal 58.9 amp threshold level set by reference Z10 and the resistor array value, comparator U3 output triggers the one-shots to a 286 microsecond on pulse, that in turn switches the associated inverting buffer IGBT gate driver off for 286 microseconds. When the IGBT turns off, coil current begins to decay, that induces a voltage potential across the coil that is of a polarity opposite the immediately proceeding applied voltage potential, such being the consequence of a negative "Ldi/dt". The polarity reversal across the coil biases the associated freewheeling diode D6 (extend) or D8 (retract) into conduction. Coil current is thereby sustained, flowing through the coil and freewheeling diode for the 286 microsecond period that IGBT gate drive is removed. During this time the current decays, however, as a portion of the total energy stored in the coil is dissipated as heat through conduction losses. Total energy storage in the coil at any instant equals $½LI^2$, "I" then equals the square root of 2×(total energy/L). As energy is lost to heat one can see that current must decrease. For this reason, when the 286 microsecond off period ends, the coil current will be less than the 58.9 amp nominal regulation threshold. U3 output will thus be high again, waiting for current through the sense resistors to reach the set point. The IGBT will be turned on and the entire cycle repeats. This cycle repeats until the predetermined on time of 105 or 150 millisecond expires or a low 16 volt Vcc fault is detected. The resulting average coil current value during the solenoid's energized period is slightly less than the 58.9 amp peak threshold. In practice the value is approximately 55 amps.

Any circuit that rapidly switches current off must be designed with proper consideration for the inductance of the source supplying current. The source may be comprised of any combination of wiring runs, power distribution transformers, buck/boost transformers etc. Therefore its reactive characteristics are unknown and vary from installation to installation. Regardless, the inductance of the source will always attempt to maintain current flow from the source regardless of what is attempting to shut it off. In the case of this circuit, the IGBTs shut off current flow. When they do the source voltage will rise in accordance the rule the e=Ldi/dt. In this case "e" equals the instantaneous voltage generated in the source inductance which will be of a polarity additive to the normal source voltage, "L" equals the source inductance in Henries, and "di/dt" is the speed in amps per second at which the sourced current is declining. This circuit switches 58 amps of current. The IGBTs are capable of turning that amount of current on and off in less than 1 microsecond. If we assume a turn off time of microsecond then di/dt equals $58×10^6$ amps/second. If the source inductance is 100 micro Henries, then the Ldi/dt product equals 5800 volts if not dealt with. By this phenomenon, potentially destructive voltage can be generated at the voltage source each time the IGBT turns off unless properly dealt with. For this reason this system uses a two level defense against transient voltages. It utilizes large Metal Oxide Varistors (MOV1 and MOV2 in FIG. 4) at each AC input of the rectifier assembly 30. Should they be required to absorb the full 58 amps flowing from the source immediately upon turn off of the IGBT, they will clamp the voltage rise at a level safely below the 1400 volt rating of the IGBTs. In the event of excessive transient energy from external sources and to share the dissipation requirement the controller assembly utilizes an array of 8 Transorbs (Zener diode type) or transient voltage suppression devices across each of the two IGBTs. These transorbs or transient voltage suppression devices are shown as Z12 through Z18 and Z20 through Z27. These devices are capable of absorbing an additional 32 amps while locally restraining the voltage across the IGBTs to safe limits. This two tier approach results in proven robust protection without-cosily capacitor arrays.

D6 and D8 are Fast Recovery Epitaxial devices (FRED) chosen for their reverse recovery speed and soft recovery behavior. Good selection minimizes transient noise and transient voltage issues related to switching inductive loads.

By careful design and component selection this circuit limits the quiescent current requirements of each controller assembly 10 to fewer than 10 (typically 5 to 7) milliamps. This achievement allows the controller assemblies to be powered direct from the rectified AC source 30 without heavy and costly transformers and without sophisticated and potentially problematic power supply circuits. Instead it utilizes two groups of three common 12 watt power resistors on the rectifier assembly plus a simple network of two small low cost capacitors C1 and C2 plus a 2 watt resistor and 1 watt zener diode, R4 and Z1 respectively as the sole components of the main electronic power supplies for the system. This is a very minimal configuration considering that each of the solenoid controller assemblies 10 control approximately 7000 watts of power into each solenoid coil 27 while operating over a source voltage range which can potentially range from 146 VAC rms (single 208 VAC supply at −30% tolerance) up to an effective rms voltage input of approximately 700 volts. The latter can result if both AC sources are on, are at the 576 VAC (480 V+20%) upper limit and are running substantially out of phase with one another. This is a significant design achievement that has significant benefits to cost, basic reliability and general robustness under stressful conditions.

Included in Appendix A following the Detailed Description is a list of exemplary components that may be used in the circuits illustrated in FIG. 1. These components are merely exemplary and other components could be utilized or readily substituted without departing from the scope of the present invention.

Appendix A
Exemplary Components
  Resistors
  R4 1 kOhms, 2 watt
  R11 130 kOhms, ¼ watt
  R12 9.09 kOhms, ¼ watt
  R13 33.2 Ohms, ¼ watt
  R14 200 Ohms, ¼ watt
  R15 50 Ohm, 5 watt
  R16 50 Ohm, 5 watt
  R17 33.2 Ohms, ¼ watt
  R18 143 kOhms, ¼ watt
  R19 90.9 Ohms, ¼ watt
  R20 3.92 kOhms, ¼ watt
  R21 200 Ohms, ¼ watt
  R22 200 Ohm, ½ watt
  R23 300 Ohm, 3 watt
  R29 130 kOhms, ¼ watt
  R30 9.09 kOhms, ¼ watt
  R32 200 Ohms, ¼ watt
  R33 200 Ohms, ¼ watt
  R334 200 Ohm, ½ watt
  R35 300 Ohm, 3 watt
  R36–R39 0.1 Ohm, 2 watt
  R40 0.121 Ohm, 2 watt
  R50–R51 10 kOhms, ¼ watt
  R52–R55 30.9 kOhms, ¼ watt
  R56–R57 10 kOhms, ¼ watt
  R58–R59 30.9 kOhms, ¼ watt
  R60 261 kOhms, ¼ watt
  R61 30.9 kOhms, ¼ watt
  R66 130 kOhms, ¼ watt
  R67 30.9 kOhms, ¼ watt
  R70–R71 100 kOhms, ¼ watt
  Capacitors
  C1 100 micro F, 63 volt
  C2 10 micro F, 50 volt
  C4 0.1 micro F, 2000 volt (snubber duty)
  C7 6.8 micro F, 35 volt
  C8 0.1 micro F, 50 volt
  C10 0.0022 micro F, 50 volt
  C15 0.01 micro F, 50 volt
  C16 0.1 micro F, 2000 volt (snubber duty)
  C17 6.8 micro F, 35 volt
  C18 0.1 micro F, 50 volt
  C19 0.1 micro F, 50 volt
  C20 0.001 micro F, 50 volt
  C21 0.1 micro F, 50 volt
  C24 0.0033 micro F, 50 volt
  C28 0.01 micro F, 50 volts
  C51–C55 0.1 micro F, 50 volt
  C57 0.1 micro F, 50 volt
  Diodes
  Z1 Zener Diode, 16 volt, 1 watt
  Z3 Zener Diode, 3.9 volt, ½ watt
  Z4 Zener Diode, 15 volt, 1 watt
  Z5 Zener Diode, 3.9 volt, ½ watt
  Z6 Zener Diode, 15 volt, 1 watt
  Z7 Zener Diode, 16 volt, 1 watt
  Z8 Zener Diode, 16 volt, 1 watt
  Z9 Zener Diode, 10 volt, ½ watt
  Z10 IC Reference 2 terminal 1.235 volt
  Z11 Zener Diode, 6.2 volt, 1 watt
  Z12–Z27 Transorb, 5000 watt unidirectional, 111 volt min VBR, 162 volt max clamp
  Transistors
  Q2 IGTB, 1400 volt, 70 amp
  Q3 IGTB, 1400 volt, 70 amp
  Rectifier Diodes
  D1 0.2 amp, 250 volt
  D5 16 amp, 1200 volt
  D6 16 amp, 1200 volt
  D7 10 amp, 1600 volt
  D8 10 amp, 1600 volt
  Integrated Circuits
  U2:A/U2:B CMOS 556 IC Dual Timer, 14 pin DIP
  U3 OP Amp IC, 8 pin DIP
  U4:A/U4:B CMOS 556 IC Dual Timer, 14 pin DIP
  U50 PIC Microcontroller, 8 bit, 14 pin DIP
  U51 Voltage Comparator, Open Collector, 8 pin DIP Voltage Regulators
VR1 5 volt
Isolators
UPT01 OPTO Isolator
UPT02 OPTO Isolator While the invention has been described in conjunction with a specific embodiment, it is to be understood that many alternatives, modifications, and variations will be apparent to those skilled in the art in light of the foregoing description. For example, without departing from the invention, the CMOS 556 IC Dual Timers could each be replaced with two (2) CMOS 555 timers. Accordingly, this invention is intended to embrace all such alternatives, modifications, and variations which fall within the spirit and scope of the following claims whether or not the components or mechanisms for achieving such alternatives, modifications and variations are presently known or are developed in the future. As another example, the effect of the mono-stable multi-vibrators could be duplicated using a digital micro-controller in place of the 556 timer and related resistors and capacitors.

What is claimed is:

1. A solenoid control system for solenoid operated transfer switches used for switching an electrical load from a first electrical power source to a second electrical power source, the system comprising:
   a transfer switch switchably connected between the first power source and the load and the second power source and the load;
   a rectifier, the rectifier being connected to at least one of said power sources;
   at least one solenoid, the solenoid being mechanically coupled to said transfer switch;
   at least one solenoid control circuit, wherein the solenoid control circuit comprises a CMOS timer integrated circuit for controlling the solenoid, the control circuit connected to said rectifier and said solenoid; and
   a controller, the controller being connected to said solenoid control circuit whereby the controller sends a signal to the solenoid control circuit thereby causing the solenoid to move the transfer switch from one of said power sources to the other.

2. The system of claim 1 wherein the transfer switch is a closed transition switch.

3. The system of claim 1 wherein the transfer switch is an open transition switch.

4. The system of claim 1 wherein the at least one solenoid is a dual action solenoid.

5. The system of claim 1 wherein the solenoid control circuit further comprises a second CMOS timer integrated circuits for controlling the solenoid.

6. The system of claim 5 wherein the solenoid control circuit further comprises transient voltage suppression means for protecting said circuit from an over voltage condition.

7. The circuit of claim 6 wherein the transient voltage suppression means comprise at least one transient absorption zener diode.

8. A solenoid control system for solenoid operated transfer switches used for switching an electrical load from a first electrical power source to a second electrical power source, the system comprising:
   a transfer switch switchably connected between the first power source and the load and the second power source and the load;
   a rectifier, the rectifier being connected to at least one of said power sources;
   at least one solenoid, the solenoid being mechanically coupled to said transfer switch;
   at least one solenoid control circuit, wherein the solenoid control circuit comprises low voltage protection means associated with said circuit for extending the time period a predetermined current is sent to each solenoid when an inadequate input voltage is received from said rectifier, the control circuit connected to said rectifier and said solenoid; and
   a controller, the controller being connected to said solenoid control circuit whereby the controller sends a signal to the solenoid control circuit thereby causing the solenoid to move the transfer switch from one of said power sources to the other.

9. The system of claim 1 wherein the rectifier is a full wave bridge rectifier.

10. The system of claim 1 wherein a stored energy source is connected to said controller.

11. A solenoid control circuit connected to first and second voltage sources, connected to an external signal mechanism and connected to a solenoid having at least one coil, said circuit comprising:
    a control means for receiving and validating a control signal from said external signal mechanism;
    a solenoid current regulator circuit including a current monitoring circuit coupled to said control means, capable of receiving said control signal, and coupled to a micro-controller means;
    a power switching means, said power switching means connected to and receiving power from one of said voltage sources;
    said micro-controller means connected to and providing timing control to said power switching means;
    said power switching means being connected to said solenoid coil; and
    said current signal allowing a solenoid current to decay for a predetermined period of time after a predetermined current level is established in the solenoid coil.

12. The circuit of claim 11 further including at least two zener diodes for protecting said power switching means from excessively high voltages in said circuit.

13. The circuit of claim 11 wherein the power switching means comprise at least one CMOS type 555 type general purpose timer.

14. The circuit of claim 11 further comprising transient voltage suppressing means coupled to said solenoid control circuit for protecting said circuit from an over voltage condition.

15. The circuit of claim 14 wherein the transient voltage suppressing means is a transient absorption zener diode.

16. The circuit of claim 11 further including voltage comparator means for monitoring at least one of said voltage sources, said voltage comparator means connected to at least one of said voltage sources and capable of extending the predetermined time current is applied to said solenoid.

17. The circuit of claim 11 further including two solenoids, each solenoid having at least one solenoid coil, said circuit being connected to each said solenoid.

18. The circuit of claim 11 wherein said current monitoring circuit comprises a current sense resistor array coupled to said circuit, a voltage comparator coupled to said resistor array, and a voltage reference mechanism for holding an input of the comparator at a substantially predetermined voltage level.

19. The circuit of claim 18 wherein the array comprises a series of metal oxide resistors.

20. The circuit of claim 18 wherein the array comprises a series of axial lead wire wound reisitors.

21. The circuit of claim 11 further including low voltage protection means associated with said power switching means for disabling said power switching means when inadequate input voltage is supplied to said circuit.

22. The circuit of claim 11 further including a shunt regulating means coupled to one of said voltage sources for maintaining a predetermined voltage level at a circuit voltage input.

23. The circuit of claim 11 further including a rectifier, said rectifier being connected to said first and said second power sources and providing a rectified voltage to operate said micro-controller and said solenoid.

24. The circuit of claim 23 wherein the rectifier further includes transient voltage suppression means whereby said micro-controller is protected from transient energy originating from said first and said second power sources.

25. The circuit of claim 23 further including at least one varistor connected to said rectifier and at least one transorb connected to said power switching means.

26. The circuit of claim 23 wherein the rectified voltage coupled to said micro-controller is coupled to a series of voltage dropping resistors.

27. The circuit of claim 11 wherein the solenoid current regulator comprises a current sense resistor coupled to a voltage regulator coupled to a voltage comparator coupled to a monostable multivibrator coupled to a gate driver coupled to a power switching semiconductor.

28. The circuit of claim 27 wherein the monostable multivibrator and gate driver comprises at least one 555 timer integrated circuits.

29. The circuit of claim 27 wherein the monostable multivibrator and gate drive comprise a 556 timer integrated circuit.

30. A circuit for controlling a current applied to a solenoid having an external signal source and a voltage source, the circuit comprising:

a signal receiving means for receiving a signal from the external signal source;

a power switching means, said power switching means being connected in series with said voltage source and said solenoid;

a current regulating solenoid driver circuit, said driver circuit capable of monitoring the signal from said signal receiving means and sending an output to said power switching means thereby allowing the current to flow through said solenoid until it reaches a predetermined level thereby causing the switching means to turn off for a predetermined period of time after which the switching means is again turned on.

31. The circuit of claim 30 wherein the current regulating driver circuit is capable of supplying a predetermined monostable signal to said power switching means.

32. The circuit of claim 31 further including a voltage comparitor means coupled to said circuit and capable of extending the predetermined time period if the voltage source falls below a predetermined voltage level.

33. The circuit of claim 30 wherein the power switching means is a insulated gate bipolar transistor.

34. The circuit of claim 30 capable of receiving an input voltage in the range of 146 to 476 volts.

35. The circuit of claim 30 wherein the power supplied to the solenoid is in excess of one thousand watts.

36. The circuit of claim 30 further including low voltage protection means associated with said power switching means for disabling said switching means when inadequate input voltage is supplied to said circuit.

37. The circuit of claim 30 further including a timing means whereby the current regulating circuit regulates the current for a predetermined period of time.

* * * * *